Figure 1:
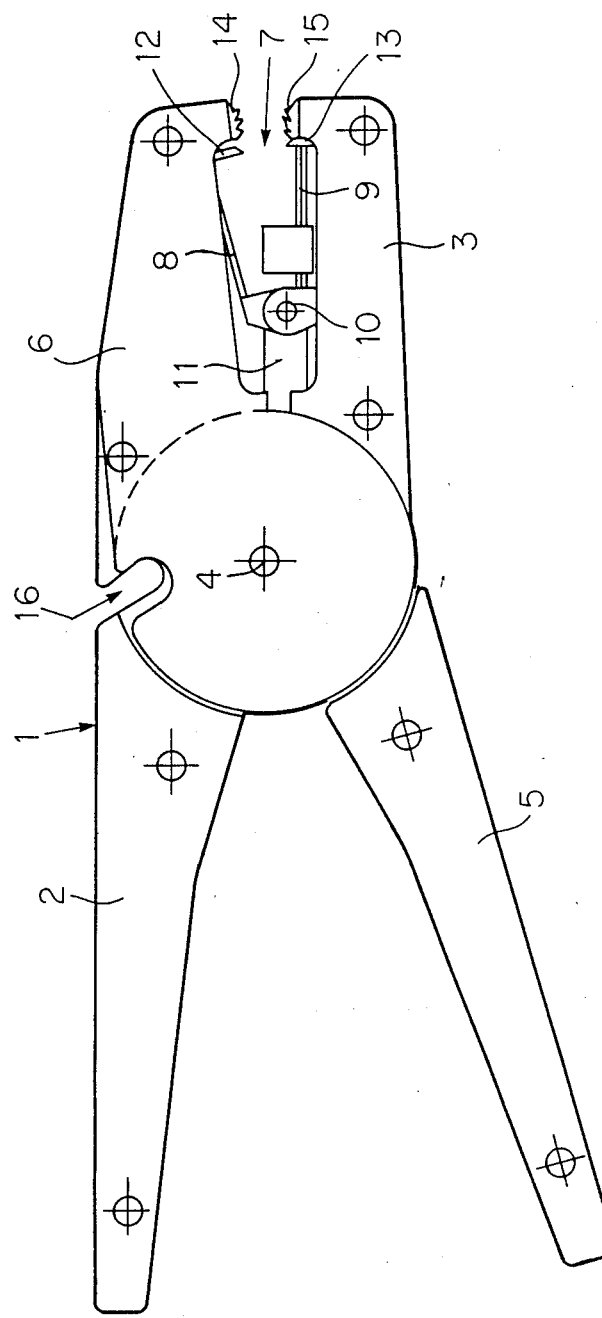

United States Patent [19]

Beetz et al.

[11] Patent Number: 4,892,015

[45] Date of Patent: Jan. 9, 1990

[54] PLIERS FOR STRIPPING THE ENDS OF CONDUCTORS

[75] Inventors: Horst Beetz, Stadtallendorf; Kurt Battenfeld, Ebsdorfergrund, both of Fed. Rep. of Germany

[73] Assignee: Wezag GmbH, Stadtallendorf, Fed. Rep. of Germany

[21] Appl. No.: 252,376

[22] Filed: Sep. 30, 1988

[30] Foreign Application Priority Data

Oct. 2, 1987 [DE] Fed. Rep. of Germany ....... 3733358

[51] Int. Cl.$^4$ .............................................. H02G 1/12
[52] U.S. Cl. ..................................................... 81/9.41
[58] Field of Search ........................ 81/9.4, 9.41, 9.42, 81/9.43

[56] References Cited

U.S. PATENT DOCUMENTS 4,407,174 10/1983 Schulze ................................. 81/9.42
4,485,696 12/1984 Bieganski ............................. 81/9.41

FOREIGN PATENT DOCUMENTS 1488808 10/1977 United Kingdom ................. 81/9.41
2084503 4/1982 United Kingdom ................. 81/9.41

Primary Examiner—Roscoe V. Parker
Attorney, Agent, or Firm—Max Fogiel

[57] ABSTRACT

Pliers for stripping the ends of conductors have a pair of handles (2 and 5) and a pair of gripping jaws (8 and 9). One (3) of the gripping jaws is integrated into one handle (2) to form a main component (1). The other handle (5) and the other jaw (6) pivot on the accordingly constituted main pliers component (1). The moving handle (5) and the moving gripping jaw (6) pivot around the same axis (4) on the main component (1) of the pliers. Stripping jaws (8 and 9) are articulated to a control lever (23) by way of a tensioning component (11). A stop (29), a control surface (30), and a limiting stop (31) are accommodated in the moving gripping jaw and associated strictly with the stripping motion.

10 Claims, 6 Drawing Sheets

PLIERS FOR STRIPPING THE ENDS OF CONDUCTORS

The invention concerns pliers for stripping the ends of conductors, with a pair of handles and with a pair of gripping jaws that demarcate a mouth and can be forced against the insulation on the conductor, whereby one of the gripping jaws is integrated into one of the handles and constitutes a main pliers component, on which the other handle and the other gripping jaw pivot, with a control lever that has a roller mounted on it and pivots on the moving handle against the force of a restoring spring, with a stop positioned on the moving gripping jaw and establishing the starting position, with a control surface and a limiting stop associated with the roller on the control lever, and with two stripping jaws that are accommodated inside the gripping jaws, that are subject to the force of an expansion spring, that pivot together at the ends remote from the mouth, and that can be jointly displaced longitudinally in the insulation-stripping direction by a tensioning component that comes into action once the moving handle has traveled a prescribed distance. Pliers of this type are employed to facilitate removing a certain length of insulation from an electric conductor without damaging the conductor. One factor that must be taken into account is that not only conductors but also various types of insulation come in different diameters.

Pliers of the aforesaid type are known from German Patent No. 2 402 187. The main component of the pliers is a single-piece, stationary handle with a stationary jaw mounted on it. The moving handle is mounted on a pivot on the main component. The moving gripping jaw is mounted on another pivot at another point on the main component. The moving gripping jaw is bluntly bent toward the moving handle, and the edge of its free face is provided with a stop, a control surface, and a limiting stop that operate in conjunction with a control lever that pivots on the moving handle and has a roller at its free end that comes into contact with the stop, the control surface, and the limiting stop. In one pivoting direction, the control lever is subject to a restoring spring in the form of a tension spring. Separate stripping jaws slide back and forth in the gripping jaws, are forced by an expansion spring against the gripping jaws, and can be forced in the insulation-stripping direction by a tensioning component and in the opposite direction by a separate spring. Secured to the tensioning component is another roller that is engaged at the appropriate point by the roller on the control lever and accordingly initiates the stripping motion. The control surface on the moving gripping jaw is positioned at a prescribed angle to the extension or force-introducing dimension of the control lever in such a way as to initially close the gripping jaws and hence also the stripping jaws when the handles are initially squeezed together, positioning the gripping jaws against the insulation on the conductor and allowing the stripping jaws to bite into the insulation to a prescribed depth. As the gripping jaws and stripping jaws close, the moving handle shifts the control lever into a position relative to the control surface that continuously changes with the closing motion of the gripping jaws. Depending on the thickness of the conductor that is being stripped, the gripping jaws stop closing with the moving gripping jaw at a different angle to the main component in such a way that the control surface will also be at a correspondingly different angle to the control lever and to the roller on its free end. Since this variability in the position of the control surface in relation to the control lever in accordance with the diameter of the conductor that is being stripped results in a difference in extraction ratios and especially in the extraction forces that must be overcome, pliers of this type can be employed only with conductors of a specific range of diameters. The known plier in fact can be used only with cross-sections ranging from 0.5 to 4 mm$^2$. Pliers of a different size and/or with different stripping jaws must be employed for other ranges of diameter. Since the range of application of these known pliers is comparatively limited, different pliers must be employed for different applications. Furthermore, the way the stripping jaws in the known pliers return to their initial position is a drawback in that they cannot do so until the control lever has returned to the stop. As soon, however, as the roller on the control lever is released from the limiting stop, the force of the restoration spring slams the roller against the control surface, causing the moving gripping jaw to execute a closing motion that is undesirable at this time, whereby the stripping jaws are also forced to closes. It then becomes possible for another restoration spring to come into action against the tensioning component and relatively advance the stripping jaws back into the gripping jaws. This action entails the risk of laterally compressing or damaging the stripped end of the conductor. Pliers wherein a stationary gripping jaw and a stationary handle constitute a main component are also known from GB Patent No. 2 084 503. The moving gripping jaw is mounted on a stationary pivot on the main component and also has mounted on it another pivot that governs the motion of the moving handle in relation to the stationary handle. The stripping jaws are directly articulated to the moving handle. The moving handle also has a stop and a control surface that operates in conjunction with a spring-loaded ball. These pliers do not have a control lever. The motion of the gripping jaws also terminates at an angle that depends on the diameter of the conductor being stripped, subsequent to which the stripping process accordingly commences, with the stripping jaws traveling the requisite stroke. Due to the mechanical connection between the parts, the restoring motion is precisely the opposite, with the closed stripping jaws moving back before the gripping jaws can open. This system also entails the risk of compressing and damaging the electric conductor.

The object of the invention is to improve pliers of the aforesaid type to the extent that they can be employed to strip conductors with wider ranges of diameter. The closing of the gripping jaws is to be functionally separated from the stripping process such that the stripping-motion situation will be identical in spite of the different diameters of the conductor being stripped, and the pliers can accordingly be employed with different ranges of diameter.

This object is attained in accordance with the invention in that the moving handle and the moving gripping jaw pivot around the same axis on the main component of the pliers, in that the stripping jaws are articulated to the control lever by way of the tensioning component, and in that the stop, the control surface, and the limiting stop are accommodated in the moving gripping jaw and associated strictly with the stripping motion. Since the moving handle and the moving gripping jaw now pivot around the same axis on the main component instead of around different axes, it becomes possible for the control lever to apply the same force to the moving handle and to the moving jaw such that no relative motion between the moving jaw and the moving handle is had. The result is a closing motion on the part of the gripping jaws during which the control lever does not execute a motion relative to the moving handle or the moving gripping jaw, but only connects the two components together to the extent that an impression is produced that the moving gripping jaw is also fastened to the moving handle such as to constitute an integrated and continuous main component. Since there is in particular also no motion on the part of the roller on the control lever relative to the moving gripping jaw and to the stop that exists at that point, the overall control lever, including its pivoting points, always remains in the same position relative to the control surface on the moving gripping jaw, no matter what conductor is gripped between the gripping jaws or what its diameter is. In other words, the closing motion of the gripping jaws is completely functionally separated from its stripping motion, and the situation during the transition between the closing motion and the stripping motion, once the gripping jaws have closed, that is, and are no longer carrying out any mutually relative motion, will always be identical. This measure makes it possible to use the pliers with a wider range of diameters. Tests have demonstrated that cross-sections ranging from 0.05 to 6.0 $mm^2$ can be covered, whereas, at the state of the art, three different-size pliers would be necessary. The functional separation of the closing motion of the gripping jaws from the stripping motion of the stripping jaws makes it possible to associate the control surface and the limiting stop only with the stripping motion and to design them accordingly. During the stripping motion, accordingly, the motion of the control lever relative to the moving gripping jaw will always be the same, so that the point at which the pressure is applied when the insulation is cut through will always be the same and the limiting stop will always come into operation in the same relative position. Since the control lever is connected to the stripping jaws by way of the tensioning component, both the forward and back motion of the stripping jaws will directly depend on the relative position of the control lever, and only one restoration spring will be necessary. Positioning the stop, the control surface, and the limiting stop in the moving gripping jaw makes it possible, in conjunction with the particular design of the control lever, to design the return motion such that the returning stroke of the stripping jaws into the gripping jaws in the open state will not occur until the gripping jaws and stripping jaws are open. This measure eliminates the risk of damaging the end of the conductor that is being stripped. An elevation, cam, or similar structure can be positioned between the stop and the control surface. In this event the control surface will not extend at a precise tangent into the stop, which is round and in which the roller rests, and there is at that point an elevation, over which the roller on the control lever slides, but not until the handles have overcome an equal force and have been squeezed farther together. The force at which the gripping jaws are to be applied against the insulation on the conductor can accordingly be simultaneously established. Obviously, the force threshold is established not only by the design of the elevation or transition between the stop and the control surface but also by the force of the restoration spring.

The limiting stop can be positioned at more or less of a right angle to the control surface, whereby the transition to the control surface will of course be rounded. The more or less right-angled position of the limiting stop in relation to the control surface is reasonable, meaning that it has a beneficial effect on the opening motion of the stripping jaws, before the force of the restoration spring becomes active.

The control lever can, between its point of articulation to the moving handle and its point of articulation to the moving jaw, be connected to the tensioning component. The connection accordingly occurs in the intermediate area, so that the stroke traveled by the roller on the free end of the control lever and the path traveled at that point are longer than the path traveled by the tensioning element. The result is a reasonable transmission of force that is reasonable for the purpose of applying the breaking-free or through-cutting force to the insulation on the conductor. Although the bearing on which the control lever is mounted on the moving handle is also positioned on a circular path around the common axis, the tensioning component will move more or less linearly in the extraction direction.

The restoration spring that the control lever is subjected to can also be designed and positioned to return the stripping jaws such that the direct connection between the tensioning component and the control lever eliminates the need for the positioning and design of two separate restoration springs, one for the control lever and one for the tensioning component. It is practical to position the restoration spring more or less where it can act on the control surface, so that the restoration spring can exert its maximal force at an angle to the limiting stop and toward the control surfaces.

The moving gripping jaw can have a boomerang-shaped recess that constitutes the stop, the control surface, and the limiting stop and accommodates, positions, and protects the roller on the control lever. The gripping jaw, which is requisite in any event, can then simultaneously be exploited in the area between its pivot on the main component and the mouth of the pliers as a stop, a control surface, and a limiting stop. It will then no longer be necessary to extend the moving gripping jaws back at a blunt angle. The especially wear-sensitive mechanism between the roller on the control lever, the stop, the control surface, and the limiting stop can then also be accommodated and protected inside the moving gripping jaw, where contaminants are less likely to accumulate than on the previously known outside and exposed control surface. Another advantage is that the pliers can be shorter.

The control lever in one preferred embodiment can bend at more or less of a right angle and have a leg that extends into the recess on the moving gripping jaw. This design is practical from the aspect of freeing the mouth of the pliers and also allows unimpeded motion of the stripping jaws in the mouth. The control lever is simultaneously accommodated and protected in the interior, and the space between the handles is completely unimpeded and can be designed closed at that point.

Each gripping jaw can have at least one stationary and one moving gripping projection, with the moving gripping projection resting against a web that pivots in the gripping jaw and that can be adjusted by means of a support component. This measure makes it possible to adjust the distribution of the gripping force, as the gripping jaws terminate their closing motion, to that section of the insulation on the conductor that must be secured. This adjustment can also occur relative to the cutting edge of the stripping jaws. When, however, the web simultaneously constitutes an adjustable support for one stripping jaw, joint adjustment that preserves a particular relative position will be possible. This measure is also reasonable.

Figure 2:
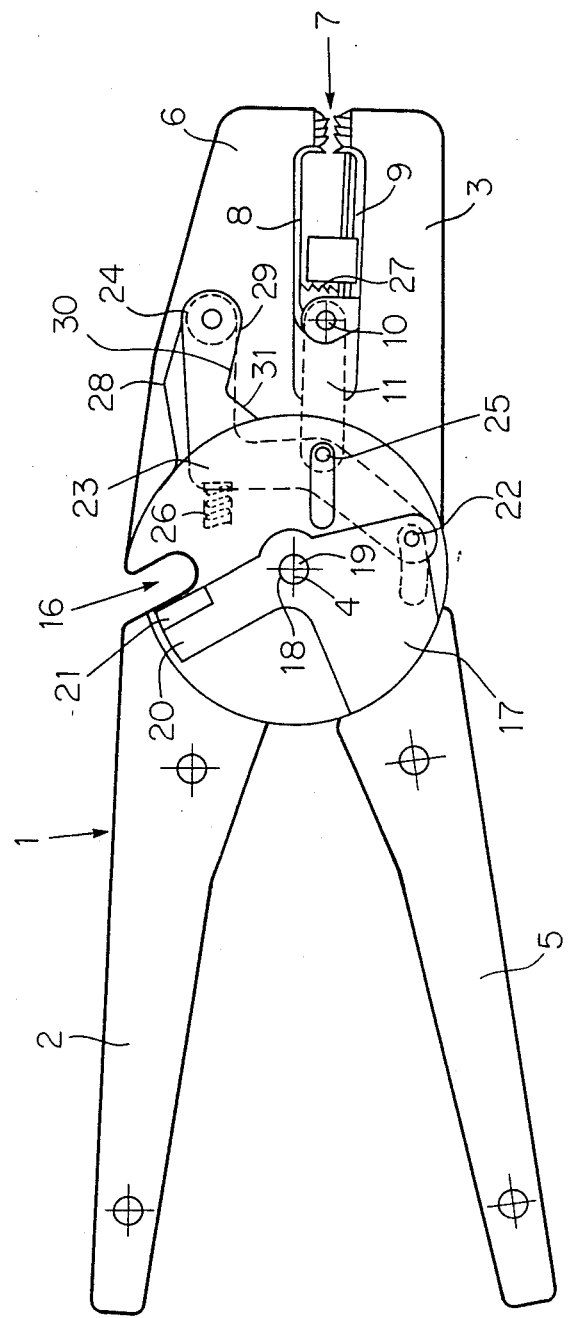
Figure 3:
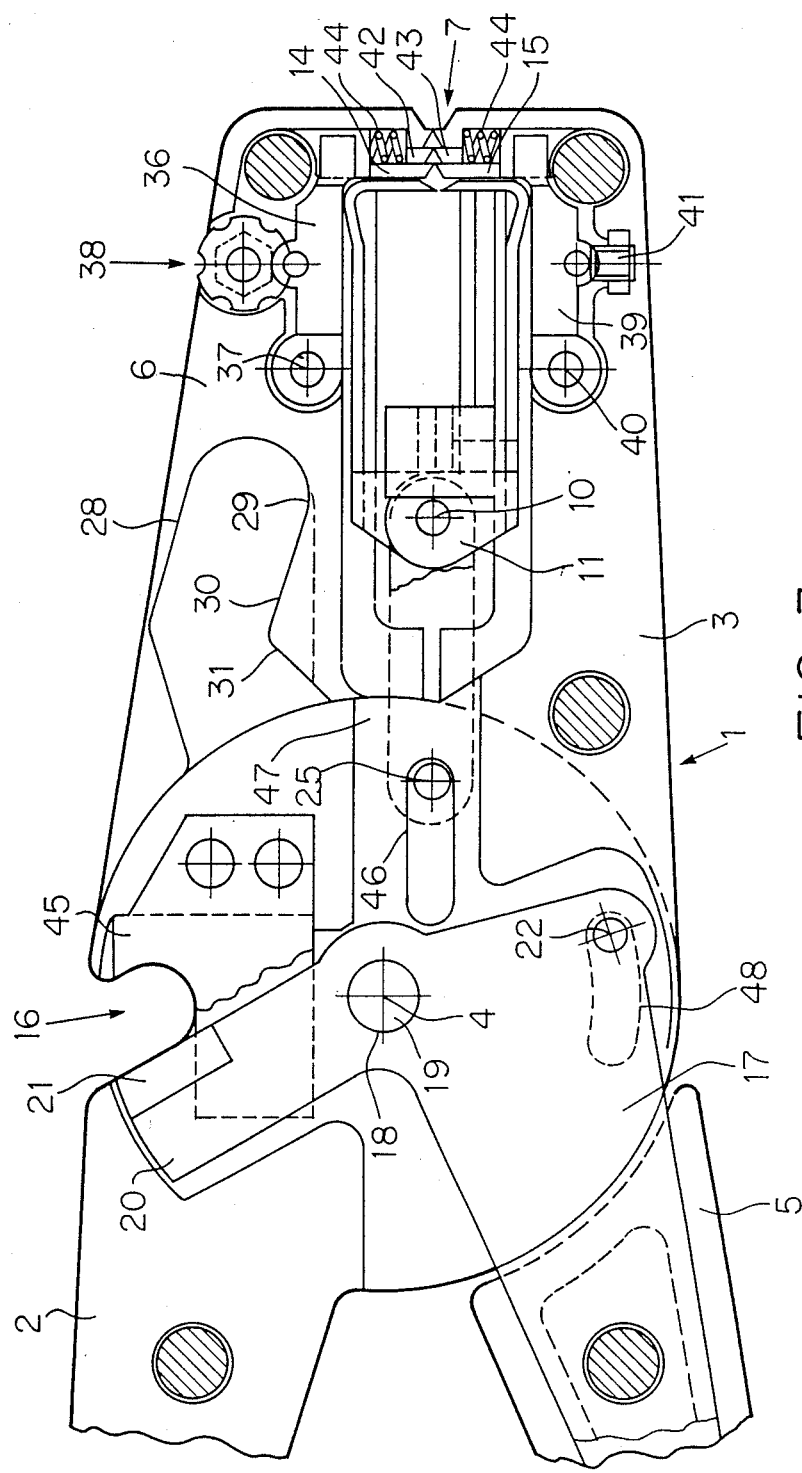
Figure 4:
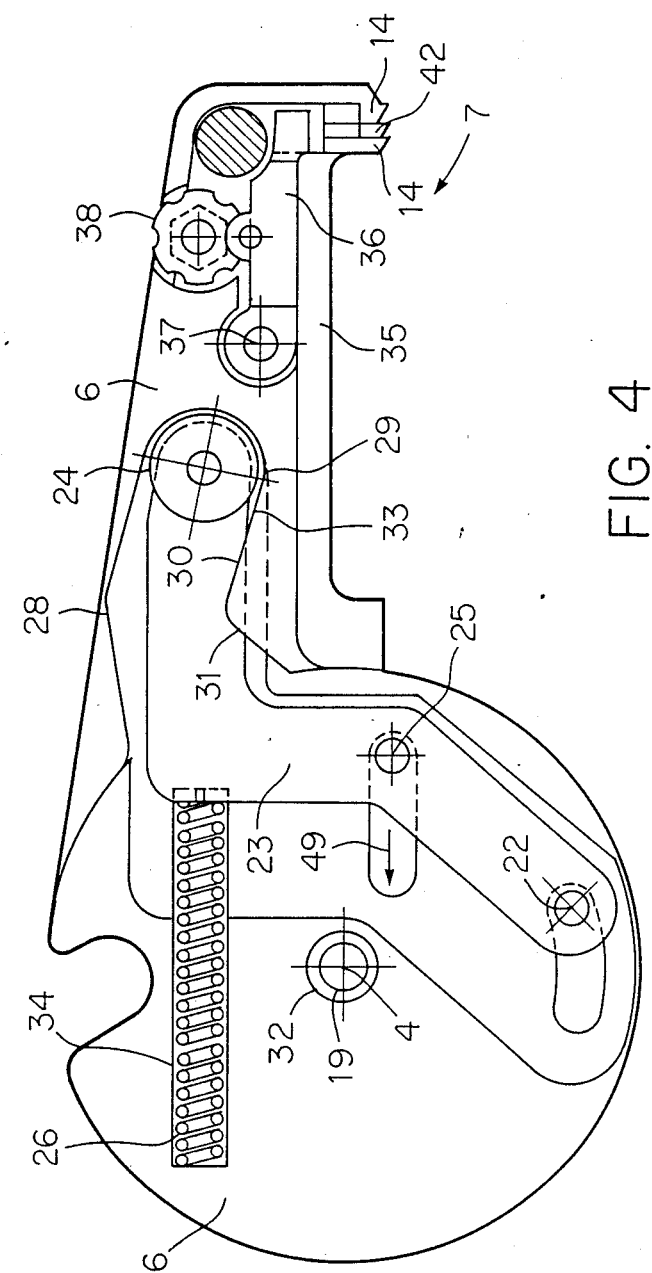
Figure 5:
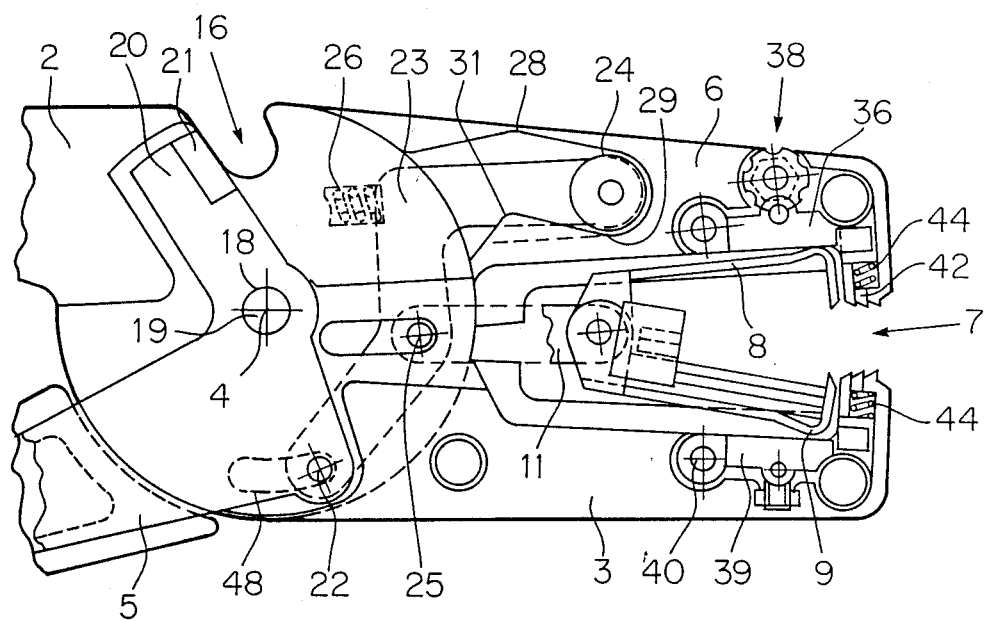
Figure 6:
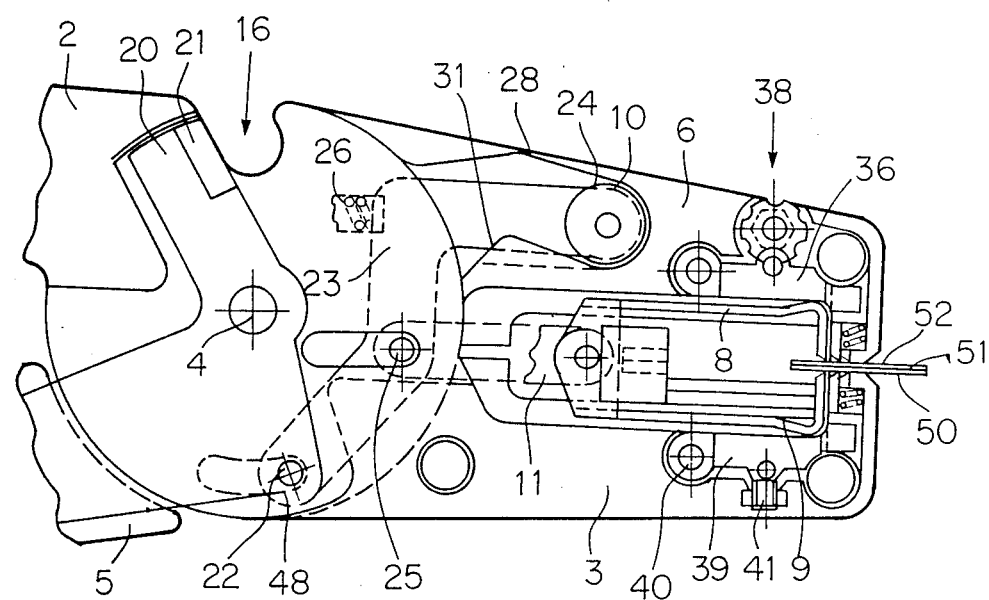
Figure 7:
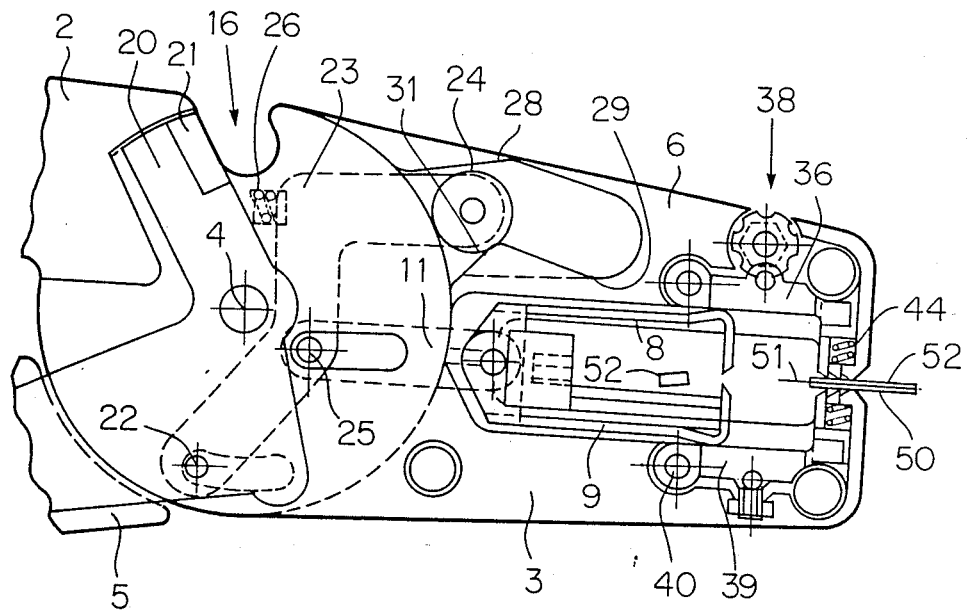
Figure 8:
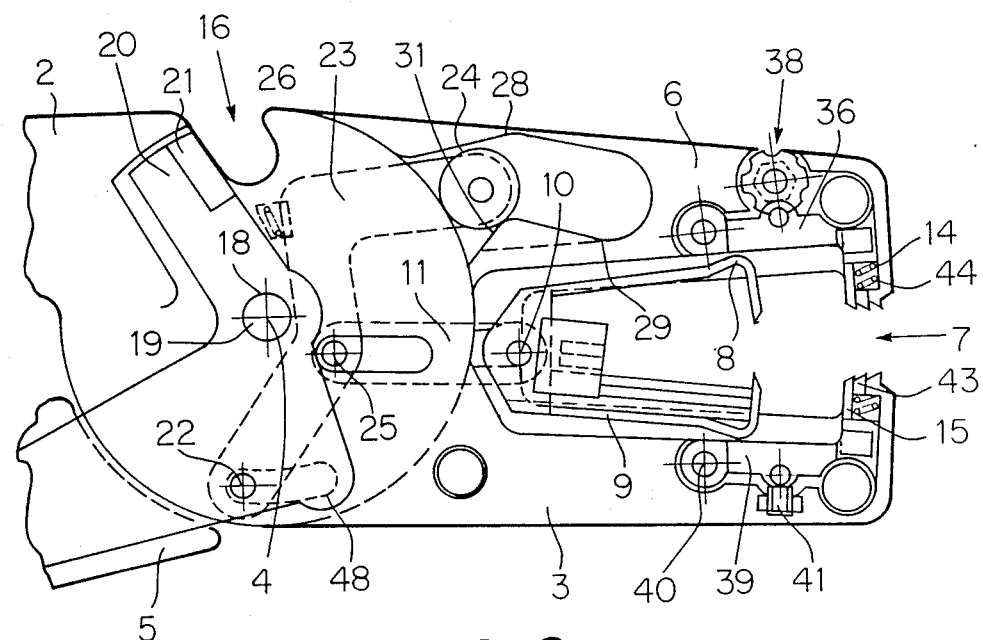

A preferred embodiment of the invention will now be further explained and described by way of example and with reference to the drawings, wherein FIG. 1 is a view of the pliers in the initial state, FIG. 2 is an X-ray view of the pliers illustrated in FIG. 1 just before the gripping jaws close, FIG. 3 is detail of the center of the pliers, FIG. 4 illustrates part of the moving gripping jaw and control lever, FIG. 5 illustrates the relative position of the essential components in the initial situation, FIG. 6 illustrates the relative position of the essential components once the gripping jaws have closed, FIG. 7 illustrates the relative position of the components at the termination of a stripping motion and before the mouth of the pliers has opened, and FIG. 8 illustrates the relative position of the components at the termination of a stripping motion and after the mouth of the pliers has opened.

Pliers, which are illustrated in their actual size in FIG. 1, have a single piece main component 1 with a stationary handle 2 and a stationary gripping jaw 3. To simplify manufacture and assembly of course, main component 1 can also consist of several parts, which would, however, be integrated into one component. Thus, the pliers could be separated along the longitudinal midplane although functioning as if integrated. Pivoting around a common axis 4 at the center of main component 1 are a moving handle 5 and a moving gripping jaw 6. Jaws 3 and 6 constitute a mouth 7 that accommodates tracks for two associated stripping jaws 8 and 9 to slide back and forth in parallel to the mouth. Stripping jaws 8 and 9 pivot around an axis 10, at which point they are attached to a tensioning component 11 that drives and lifts stripping jaws 8 and 9 parallel with mouth 7. At their free forward ends, stripping jaws 8 and 9 are provided with cutting edges 12 and 13 that, in association with each other, cut into the insulation on the conductor that is to be stripped when the pliers are activated. At the free ends of moving gripping jaws 6 and 3 are gripping projections 14 and 15, on which the closed gripping jaws 6 and 3 rest against the insulation on the conductor that is being stripped. At the center of the pliers and in a practical position between main component 1 and moving handle 5 is a cutter 16 for cutting sections of conductor to length.

FIG. 2 illustrates the inside of the pliers. Mounted on moving handle 5, which, like the stationary handle and gripping jaws 6 and 3, can be an injection-molded plastic piece, is a metal levering plate 17 with a bore 18, around which it and hence moving, handle 5 pivot on a pin 19 and accordingly around axis 4. Levering plate 17 has a projecting lever 20 with a cutting edge 21 that is part of cutter 16. Also mounted on levering plate 17 is a point 22 of articulation in the form of a pin or similar structure for example, to which a bent control lever 23 in the shape of a boomerang is articulated. The free end of control lever 23, which is, in the framework of the pliers, of double construction, has a roller 24 that rotates freely between the two halves of the lever. Tensioning component 11 is articulated to a point 25 of articulation on control lever 23. A restoration spring 26 in the form of a compression spring forces control lever 23 clockwise around point 22 of articulation. When control lever 23 is made out of two symmetrical halves, restoration spring 26 can also be in two parts. The end of restoration spring 26 that points away from control lever 23 is supported in moving gripping jaw 6. An expansion spring 27, which can also be a leg spring around axis 10, forces stripping jaws 8 and 9 open to the extent that they will always be completely open when allowed by gripping jaws 6 and 3. Moving gripping jaw 6 contains a recess 28 wherein both roller 24 and the section of control lever 23 that extends to that point can move. Inside the recess are positioned as illustrated a stop 29, a control surface 30, and a limiting stop 31 that roller 24 of control lever 23 operates in conjunction with when the pliers are activated. FIG. 2 illustrates the relative position assumed by the various components while gripping jaws 6 and 3 are closing. Particular note should be taken that roller 24 always remains against stop 29 and in a constant relative position throughout the closing motion.

FIGS. 3 and 4 are larger-scale details that illustrate the particulars more clearly and summarily. Both figures are associated, and control lever 23 is, along with roller 24, for the sake of clarity not illustrated in FIG. 3. Moving gripping jaw 6 can also be made out of two symmetrical halves. FIG. 4 is a top view of that component with its associated control lever 23. The moving gripping jaw 6 in FIG. 4 has a bore 32 like the bore 18 in main component 1. Bores 18 and 32 coincide and accommodate the pin 19 that governs the various pivoting motions. Pin 19 is positioned at axis 4. Moving gripping jaw 6 accommodates recess 28, in the vicinity of which are, as illustrated, stop 29, control surface 30, and limiting stop 31. Limiting stop 31 extends more or less at a right angle to control surface 30. Between stop 29 and the initial section of control surface 30 is an elevation 33 that creates a force threshold that must be overcome. Moving gripping jaw 6 has a depression 34 that accommodates restoration spring 26. Moving gripping jaw 6 and control lever 23 are made out of two symmetrical halves with their essential components separated, and roller 24 is positioned between the two halves and connects them at that point. On moving gripping jaw 6 (and on stationary gripping jaw 3) are tracks 35, along which stripping jaws 8 and 9 slide back and forth. At the front of mouth 7 and in the vicinity of moving gripping jaw 6 a web 36 pivots around a pin 37. A setting device 38 allows web 36 to pivot and accordingly varies the initial section of the track 35 that stripping jaws 8 and 9 rest on. Setting device 38 is employed to set the depth that the cutting edge 12 on stripping jaw 8 (FIG. 3) penetrates to. Another web 39 pivots similarly around a pin 40. There is a sealed-off setscrew 41 in stationary gripping jaw 3 that is adjusted at the factory to basically establish the relative position of cutting edges 12 and 13. Setting device 38 on the other hand is employed when the pliers are being used. Webs 36 and 37, however, not only constitute the initial section of track 35 but are extended in the vicinity of gripping projections 14 and 15 to simultaneously constitute a support for a moving gripping projection 42 in addition to stationary gripping projections 14 in the vicinity of moving gripping jaw 6, whereas there is a moving gripping projection 43 between two stationary gripping projections 15 in the vicinity of stationary gripping jaw 3. Springs 44 can be integrated into the support. It will accordingly be apparent that the extension of webs 36 and 39 not only varies the depth of penetration of the cutting edges 12 and 13 on stripping jaws 8 and 9 but also moving gripping projections 42 and 43.

FIG. 3 also illustrates a backup cutting edge 45 secured stationary in main component 1 and in conjunction with which the cutting edge 21 on levering plate 17 operates, accordingly constituting the essential components of cutter 16. The other details illustrated in FIGS. 3 and 4 are essentially employed in the assembly and interconnection of the major components. Since they are not basically significant to the operation of the pliers, their functions will not be specified herein. It should, however, be pointed out that the various components of the pliers are positioned in relation to the plane of projection of FIGS. 3 and 4 in the order that will now be described. The bottommost component is one symmetrical half of stationary gripping jaw 3 in conjunction with control lever 23. On top of these is main component 1 in conjunction with stationary handle 2 and stationary gripping jaw 3, which is itself made out of two halves that are symmetrical with respect to the midplane. Main component 1 has a recess 46 (FIG. 3) that extends toward axis 4 and through which a bolt that constitutes point 25 of articulation extends between and unites the two halves of control lever 23. In another perforation 47, tensioning component 11 extends into the main component of the pliers and itself pivots on the bolt that constitutes point 25 of articulation, whereas stripping jaws 8 and 9 are positioned at its other end on axis 10. The levering plate 17 on moving handle 5 engages between the symmetrical halves of main component 1 and is mounted on pin 19 at that point. The other side of main component 1 is covered up by all or part of a moving gripping jaw 6 that is axially symmetrical to FIG. 4, whereby the previously mentioned axially symmetrical control lever 23 and restoration spring 26 are again present. It will be evident (FIG. 3) that the central section of main component 1 has a slot 48, more or less in the form of the arc of a circle around axis 4, through which extends a bolt that constitutes point 22 of articulation and rotates at both ends in relation to the two halves of control lever 23. It will accordingly be obvious that, when moving handle 5 and hence levering plate 17 rotate, control lever 23 will be carried along in the same motion, with the roller 24 that connects the two halve of the lever initially not leaving stop 29 until gripping jaws 6 and 3 are closed. At that instant, and as handles 5 and 2 approach each other, roller 24 will move away from stop 29, overcoming the force threshold represented by elevation 33. As roller 24 rolls along control surface 30, point 25 of articulation will move along a path that deviates somewhat from a straight line in the direction indicated by arrow 49 (FIG. 4), upon which tensioning component 11, and with it stripping jaws 8 and 9, will commence their forward stroke and initiate the stripping off of the section of insulation enclosed between cutting edges 12 and 13.

To explain the sequence of events even more clearly, reference is now made to FIGS. 5 through 8. FIG. 5 represents the pliers in their initial state. Restoration spring 26 forces roller 24 against stop 29, and gripping jaws 6 and 3 are, in conjunction with expansion spring 27 (FIG. 2), open. Mouth 7 is accordingly open, and a conductor 50 with a metal core 51 and insulation 52 can be introduced into it, whereby the depth to which it is introduced and hence the length of the section of insulation 52 that is to be stripped off can be established by known means on stripping jaws 8 and 9. Gripping jaws 6 and 3 and stripping jaws 8 and 9 are now closed by squeezing moving handle 5 toward stationary handle 2. When the closing operation is complete, as illustrated in FIG. 6, gripping projections 14 and 42 and 15 and 43 will be resting against the insulation 52 on conductor 50 or even biting into it, and cutting edges 12 and 13 will be penetrating into the insulation to the extent established. Attention is directed in particular that, up to this point, at the termination of the closing procedure, roller 24 continues to rest in stop 29 and that the position of control surface 30 relative to control lever 23 remains unchanged. Only as handles 2 and 5 are squeezed farther together and the force threshold established by elevation 33 is overcome do stripping jaws 8 and 9 come into motion at the back of mouth 7 as roller 24 rolls along control surface 30. This operation forces apart the incision in insulation 52 established by cutting edges 12 and 13 and extracts the section that is to be removed in the direction traveled by stripping jaws 8 and 9 back and away from the core 51 of conductor 50. At the end of this stroke, the relative positions are as illustrated in FIG. 7, with roller 24 entering limiting stop 31, so that control lever 23, and along with it, due to tensioning component 11, stripping jaws 8 and 9 are initially prevented from reversing the direction that they are traveling in, even though handles 2 and 5 separate again subsequent to the stripping process. Since roller 24 is locked at or behind limiting stop 31, mouth 7 is initially forced to open again as the handles separate in that both gripping jaws 6 and 3 and stripping jaws 8 and 9 separate at the rear dead center of their stroke as illustrated in FIG. 8. Only once this opening operation has been achieved and handles 2 and 5 continue to separate, can roller 24 free itself from limiting stop 31 and be returned to recess 28 and stop 29, at which the initial state illustrated in FIG. 5 is attained again and another stripping process can be carried out. It will be obvious that the stripped section of conductor 50 and the stripped-off section of insulation can be released from or will drop out of mouth 7 and have not deleterious effects. What has been especially eliminated is the risk of the stripped section of core 51 being compressed or damaged during the return stroke of stripping jaws 8 and 9, which occurs while mouth 7 is open.

We claim:

1. Pliers for stripping the ends of conductors, with a pair of handles and with a pair of gripping jaws that demarcate a mouth and can be forced against the insulation on the conductor, whereby one of the gripping jaws is integrated into one of the handles and constitutes a main pliers component, on which the other handle and the other gripping jaw pivot, with a control lever that has a roller mounted on it and pivots on the moving handle against the force of a restoring spring, with a stop positioned on the moving gripping jaw and establishing the starting position, with a control surface and a limiting stop associated with the roller on the control lever, and with two stripping jaws that are accommodated inside the gripping jaws, that are subject to the force of an expansion spring, that pivot together at the ends remote from the mouth, and that can be jointly displaced longitudinally in the insulation-stripping direction by a tensioning component that comes into action once the moving handle has traveled a prescribed distance, characterized in that the moving handle (5) and the moving gripping jaw (6) pivot around the same axis (4) on the main component (1) of the pliers, in that the stripping jaws (8 and 9) are articulated to the control lever (23) by way of the tensioning component (11), and in that the stop (29), the control surface (30), and the limiting stop (31) are accommodated in the moving gripping jaw and associated strictly with the stripping motion.

2. Pliers as in claim 1, characterized by an elevation (33), cam, or similar structure that constitutes a force threshold between the stop (29) and the control surface (30).

3. Pliers as in claim 1 or 2, characterized in that the limiting stop (31) is positioned at more or less of a right angle to the control surface (30).

4. Pliers as in claim 1, characterized in that the control lever (30) is, between its point (22) of articulation to the moving handle (5) and its point (25) of articulation to the moving jaw (6), connected to the tensioning component (11).

5. Pliers as in claim 1, characterized in that the restoration spring (26) that the control lever (23) is subjected to can also be designed and positioned to return the stripping jaws (8 and 9).

6. Pliers as in claim 5, characterized in that the restoration spring (26) is positioned more or less where it can act on the control surface (30).

7. Pliers as in claim 1, characterized in that the moving gripping jaw (6) has a boomerang-shaped recess (28) that constitutes the stop (29), the control surface (30), and the limiting stop (31) and accommodates, positions, and protects the roller (24) on the control lever (23).

8. Pliers as in claim 1, characterized in that the control lever (23) bends at more or less of a right angle and has a leg that extends into a recess (28) on the moving gripping jaw (6).

9. Pliers as in claim 1, characterized in that each gripping jaw (6 and 3) has at least one moving gripping projection (42 and 43), with the moving gripping projection resting against a web (36 and 39) that pivots in the gripping jaw and that can be adjusted by means of a setting device (38 and 41).

10. Pliers as in claim 9, characterized in that the web (26 and 39) simultaneously constitutes an adjustable support for one stripping jaw (8 or 9).

* * * * *